(12) United States Patent
Joedicke

(10) Patent No.: US 6,358,305 B1
(45) Date of Patent: Mar. 19, 2002

(54) DARKENED HEADLAP MANUFACTURING PROCESS AND PRODUCT PRODUCED THEREBY

(75) Inventor: Ingo B. Joedicke, Hedgesville, WV (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/521,146

(22) Filed: Mar. 8, 2000

(51) Int. Cl.⁷ .............................................. C09D 191/00
(52) U.S. Cl. ........................ 106/261; 106/248; 106/262; 106/475; 427/256
(58) Field of Search ................................ 106/248, 261, 106/262, 475; 427/256

(56) References Cited

U.S. PATENT DOCUMENTS

| | | | |
|---|---|---|---|
| 446,145 A | * 2/1891 | Cunningham | ............... 106/261 |
| 4,128,438 A | 12/1978 | Wolff et al. | .................. 106/307 |
| 4,171,267 A | 10/1979 | McAfee et al. | ............... 252/8.6 |
| 4,173,489 A | 11/1979 | Crawford et al. | ............ 106/281 |
| 4,274,243 A | 6/1981 | Carbin et al. | ............... 52/748 |
| 4,359,505 A | 11/1982 | Joedicke | ..................... 428/404 |
| 4,378,408 A | 3/1983 | Joedicke | ..................... 428/403 |
| 4,478,911 A | 10/1984 | Price | .......................... 428/332 |

* cited by examiner

*Primary Examiner*—David Brunsman
(74) *Attorney, Agent, or Firm*—Imre Balogh; William J. Davis

(57) ABSTRACT

Composition and process for preparing darkened headlap, the composition having base granules treated with a suspension containing: a hydrocarbon oil or a hydrocarbon/drying oil mixture; carbon black; and an organosilicon compound of formula I $$R_nSi(OR')_{4-n}$$

wherein R is a large organic group, such as a long-chain alkyl group, R' is lower alkyl of 1–6 carbons, and n is 1–3, or a siloxane polymer of two or more silane units.

24 Claims, 6 Drawing Sheets

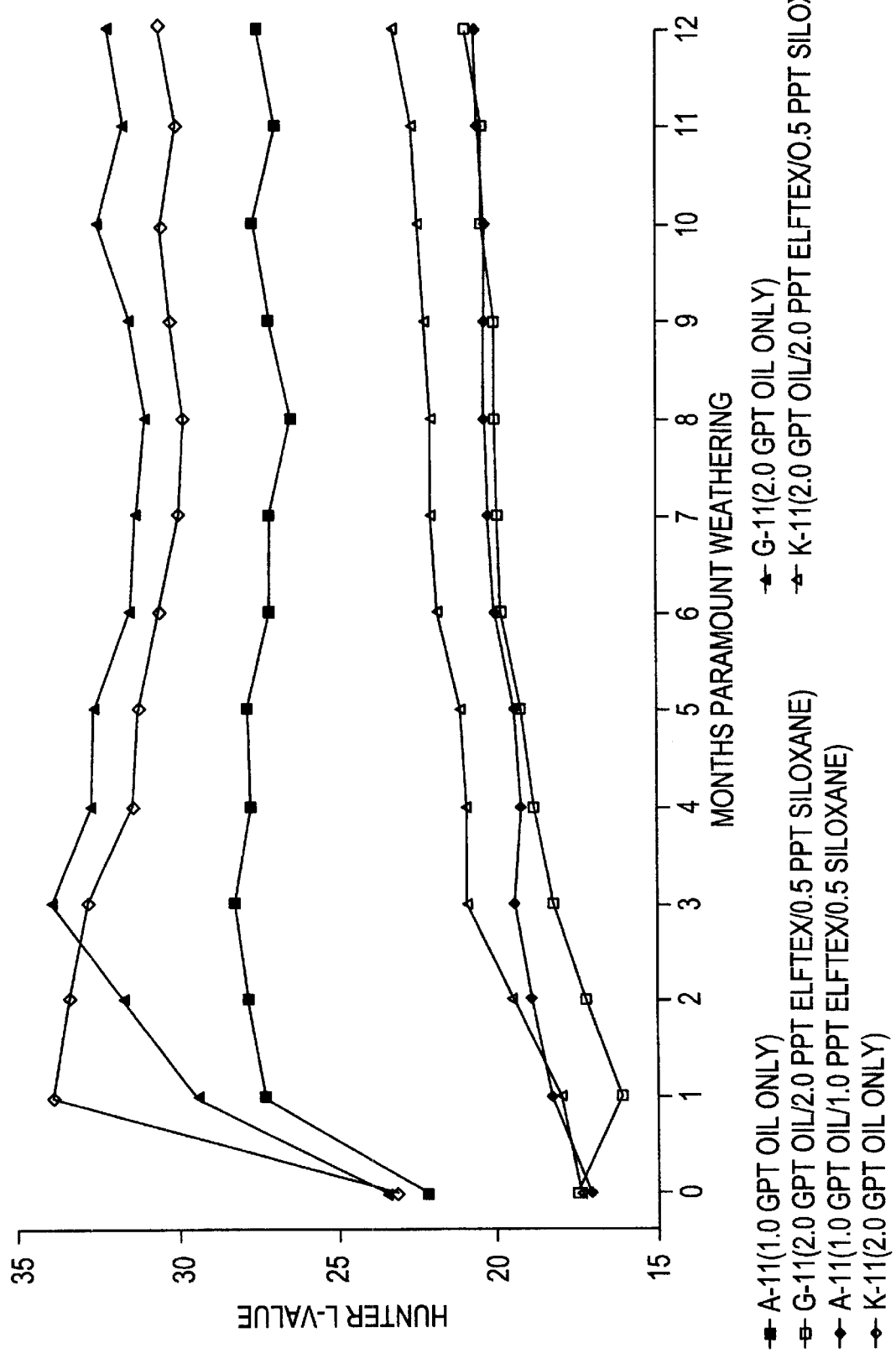

DARKENED HEADLAP MANUFACTURING PROCESS AND PRODUCT PRODUCED THEREBY

BACKGROUND OF THE INVENTION

1. Field of the Invention

This invention relates to a coating composition for roof shingles. More particularly, the invention relates to a coating composition for the headlap section of roof shingles.

2. Reported Developments

Roof shingles have to satisfy function, durability and aesthetic appeal. They also have to be inexpensive in order to be marketable. The prior art had addressed these requirements such as disclosed in U.S. Pat. Nos. 4,128,438; 4,274,243; 4,359,505; and 4,378,408.

Roof shingles are intended to provide shelter for the underlying roof structure from precipitation, wind, cold and sun rays, i.e. the roof shingles must be weatherproof and remain so for an extended time period. The roof shingles must also present an aesthetically pleasing feature covering the underlying roof structure. These requirements must be satisfied using inexpensive raw materials.

Roof shingles are typically coated with granules. The granules are generally embedded in the asphalt coating on the surface of an asphalt impregnated felt base material, the granules thus forming a coating that provides an adherent, weather-resistant exterior roofing surface. As the granule coating also provides the aesthetic effect observable with respect to the roofing composition, the appearance of the granules is of major marketing interest. For this reason a pigmented color coat is typically applied to the base mineral granules to enhance their visual, decorative effect. Alternatively, natural crushed stone aggregates have been used instead of the artificially colored granules. This approach has resulted in substantial cost savings.

The present invention is directed to compositions using crushed stone aggregates. More particularly, the present invention is directed to compositions comprising crushed stone aggregates for coating the headlap portion of roof shingles.

The prior art has used natural crushed stone aggregates to which a hydrocarbon oil is applied to control dust. This crushed stone aggregate, being less expensive than artificially colored granules, was applied to the headlap portion of the shingles during the manufacturing process. Although natural headlap granules are inexpensive, more extensive use of them is limited by the fact that they are not as dark or uniform in appearance as desired. For that reason, many shingle manufacturers utilize coal slag or other dark waste aggregate for manufacturing headlap. Furthermore, in order to improve the appearance of natural headlap, efforts have been made to induce a darker color. Thus carbon black has been incorporated in the hydrocarbon oil that was applied to control dust. Darkening of the aggregate results when the hydrocarbon oil deposits carbon black particles within the rock pores as the oil is absorbed into the rock surface. Although effective for pigmentation, the carbon black has poor weathering resistance since it is not strongly bonded to the rock surface and is lost within a few months of weathering exposure.

It has now been surprisingly discovered during weathering studies that pigmentation retention of natural headlap darkened with a hydrocarbon oil/carbon black mixture can be significantly improved by incorporating certain organosilicon compounds in the mixture. The critical requirements in the organosilicon compounds include:

- availability of alkoxy or other hydrolizable functional groups to allow bonding with the silanol surface of the rock aggregates;
- availability of alkyl or other oleophilic groups that strongly interact with the surface of the carbon black particles; and
- complete oil miscibility.

SUMMARY OF THE INVENTION

In accordance with the present invention there is provided a composition for application to a headlap comprising per ton of granules:

of from about 1.0 to about 2.5 gallons of a hydrocarbon oil/boiled linseed oil mixture in which the proportion of boiled linseed oil ranges of from about 25% to about 50%;

of from about 0.5 to about 2.0 pounds of powdered or beaded fine particle size carbon black; and of from about 0.25 to about 1.0 pound of an organosilicon compound.

The process of manufacturing comprises the steps of:

preparing the process oil/boiled linseed oil/organosilicon compound mixture;

heating the mixture from 90–110° F. to reduce viscosity to aid carbon black incorporation and to improve rock pore penetration;

mixing a powdered or beaded fine particle sized carbon black with the mixture above to form a homogeneous suspension;

adding this oil/carbon black mixture to the natural headlap granules or colored waste granules in a rotary mixer.

The organosilicon compounds are monomeric silanes having the formula I:

$$R_nSi(OR')_{4-n} \qquad I$$

wherein

R is a large organic group, and preferably a long-chain alkyl group of 6 or more carbons, and most preferably, a long-chain alkyl group of 8–28 carbons;

R' is lower alkyl having 1 to 6 carbons, and preferably 1 to 3 carbons, so that the alkoxy functionality is readily hydrolizable and siloxane bond formation with the rock substrate will be rapid; and n is 1–3, and preferably 1.

Examplary compounds which are also commercially available are as shown in Table A.

TABLE A

| Chemical Name | Chemical Formula |
|---|---|
| n-Decyltriethoxysilane | $CH_3(CH_2)_9Si(OCH_2CH_3)_3$ |
| Docecyltriethoxysilane | $CH_3(CH_2)_{10}CH_2Si(OCH_2CH_3)_3$ |
| Hexadecyltrimethoxysilane | $CH_3(CH_2)_{14}CH_2Si(OCH_3)_3$ |
| Hexyltrimethoxysilane | $CH_3(CH_2)_4CH_2Si(OCH_3)_3$ |
| Isooctylmethoxysilane | $(CH_3)_3CH_2(CH_3)CHCH_2Si(OCH_3)_3$ |
| n-Octadecyltriethoxysilane | $CH_3(CH_2)_{16}CH_2Si(OCH_2CH_3)_3$ |
| n-Octadecyltrimethoxysilane | $CH_3(CH_2)_{16}CH_2Si(OCH_3)_3$ |
| n-Octyltriethoxysilane | $CH_3(CH_2)_6CH_2Si(OCH_2CH_3)_3$ |
| n-Octyltrimethoxysilane | $CH_3(CH_2)_6CH_2Si(OCH_3)_3$ |

Preferably, the organosilicon compounds are siloxane polymers of two or more silane units having the desired functional group characteristics. Examples of commercially available polymeric siloxanes are shown in Table B.

TABLE B

| Siloxane Designation by Manufacturing | Manufacturer | Composition |
| --- | --- | --- |
| DF104 | General Electric | Polyalkylmethyl-siloxane Resin |
| TBS106BR | Path Silicones | Polyalkylmethyl-siloxane Resin |
| HL15M | Goldschmidt | Polyalkylethyl-siloxane Resin |
| Rhodorsil4518 | Rhone-Poulenc | Dimethyl Polysiloxane Resin |

BRIEF DESCRIPTION OF THE DRAWINGS

FIG. 1 is a graph of a darkened headlap weathering, designated as A-11, of five samples each of which contained fine base granules treated with:

Figure 2:
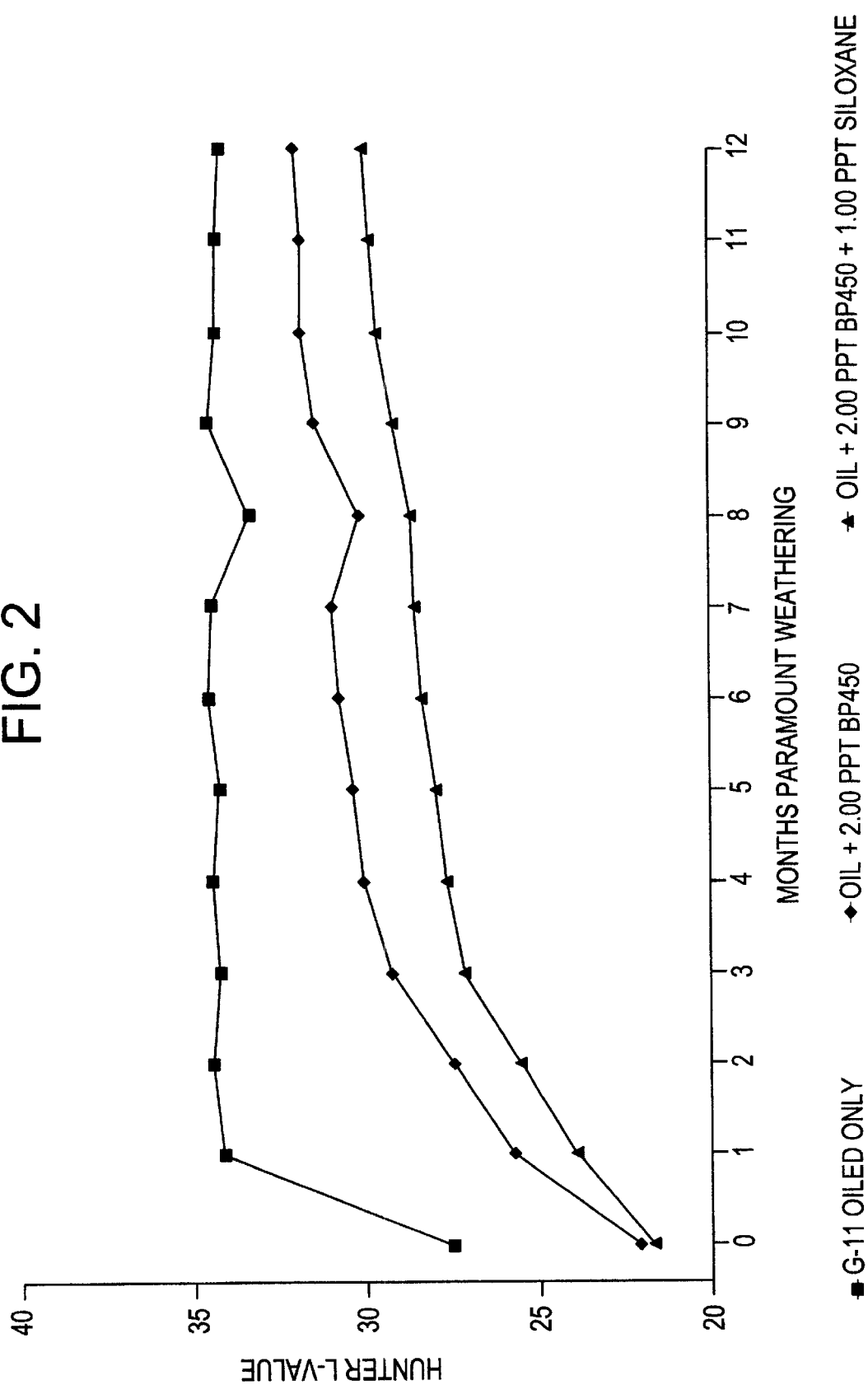
Figure 3:
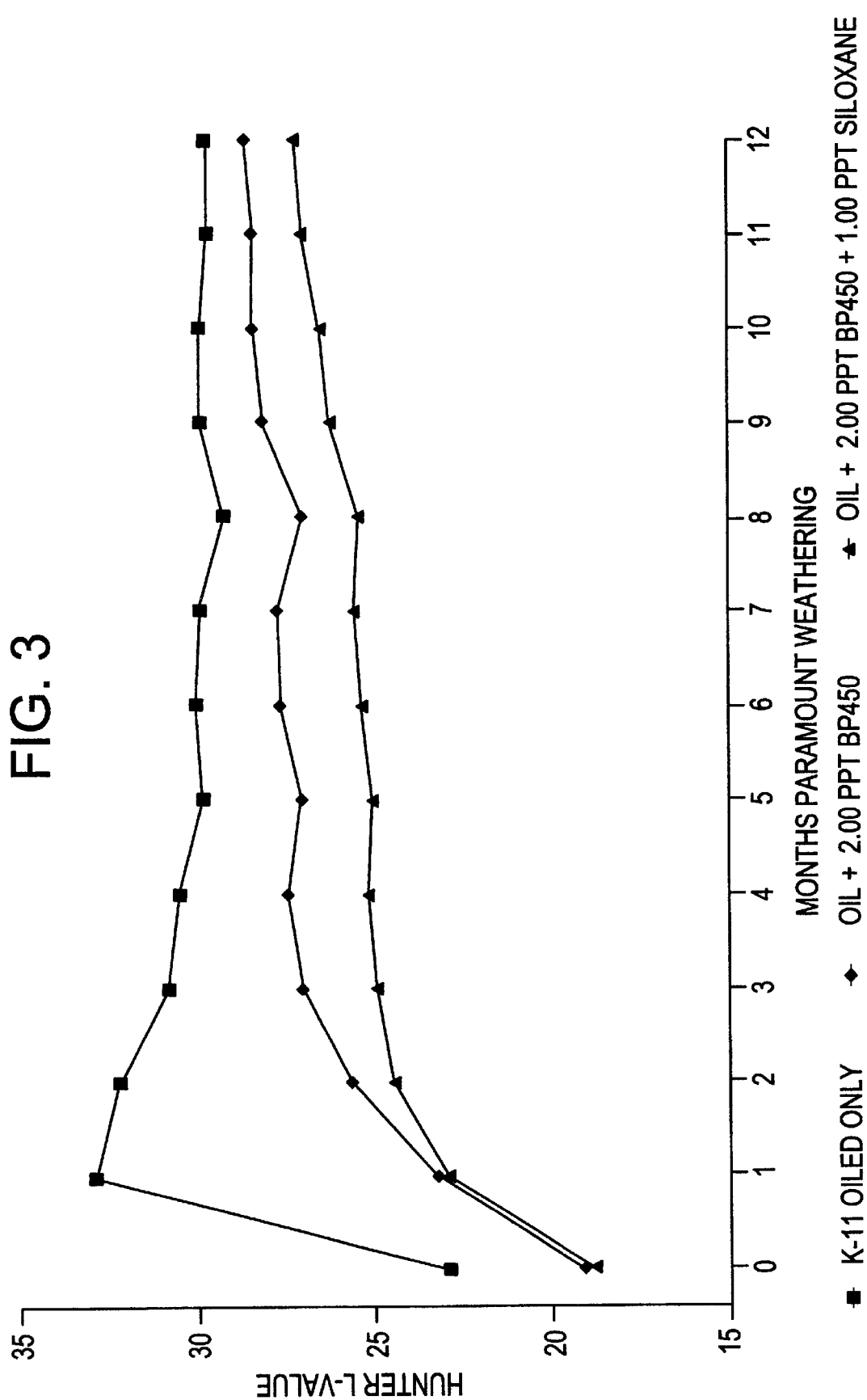
Figure 4:
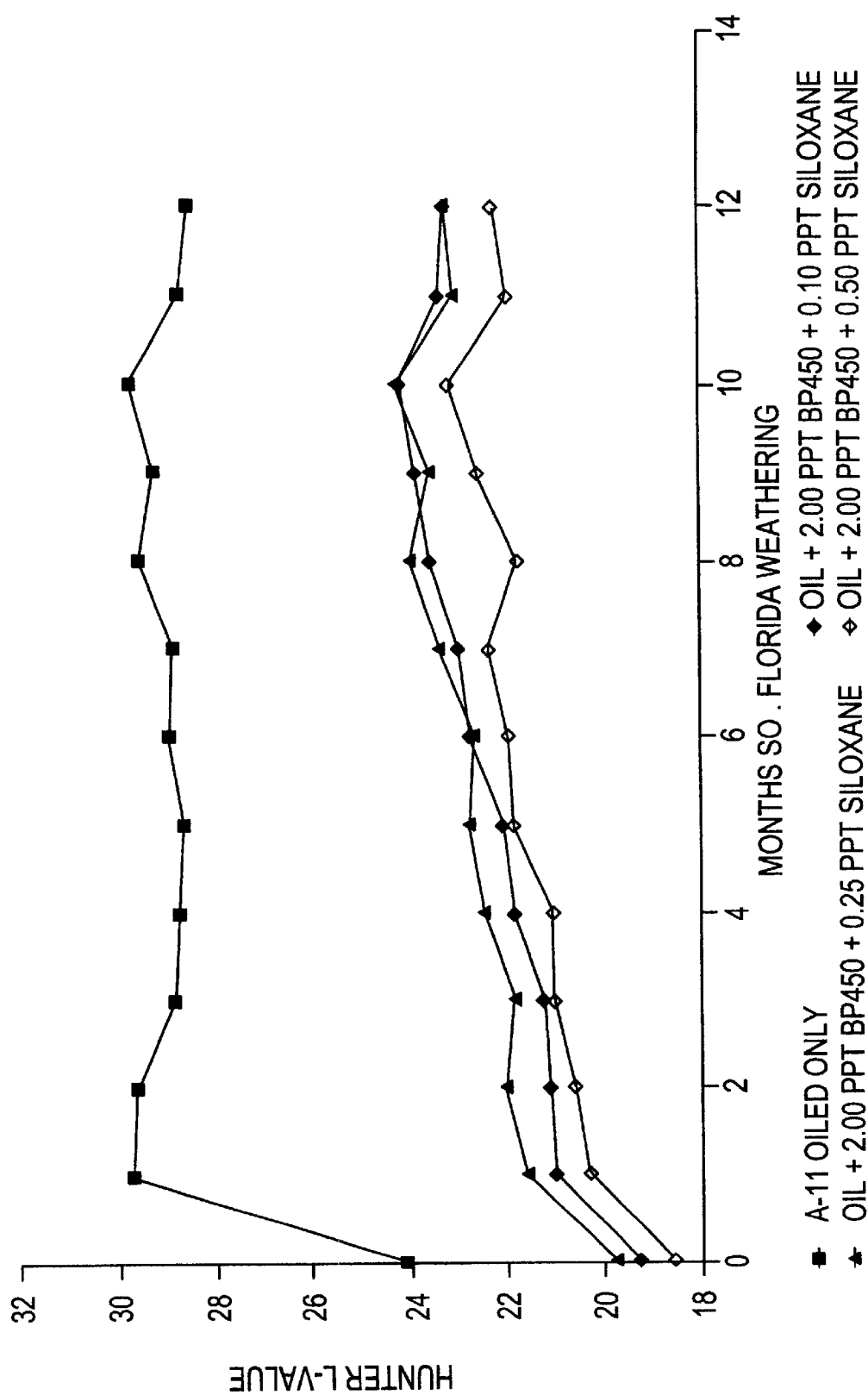
Figure 5:
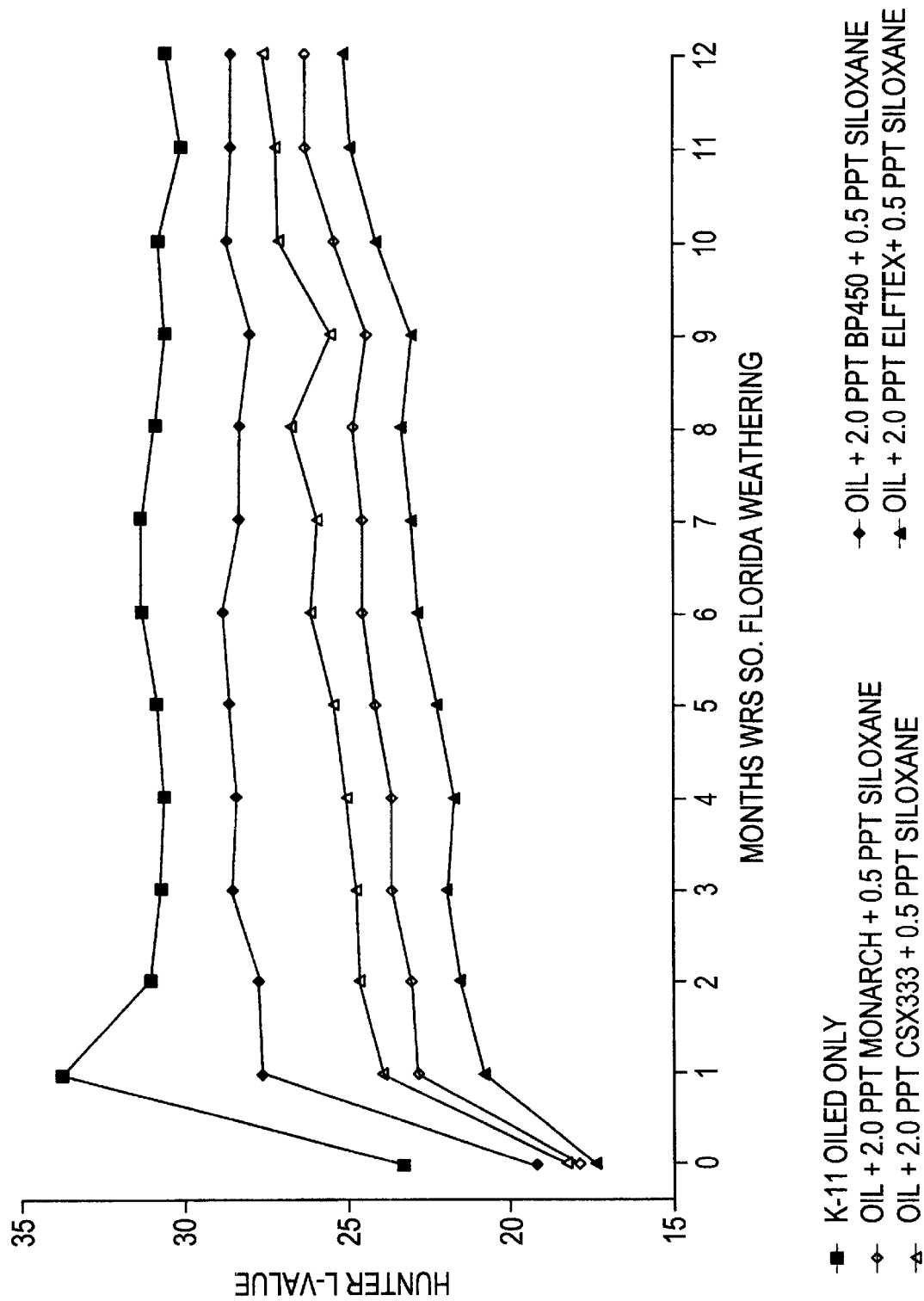

(a) oil only;
(b) oil and 2.00 ppt carbon black;
(c) oil, 2.00 ppt carbon black and 0.25 ppt siloxane;
(d) oil, 2.00 ppt carbon black and 0.50 ppt siloxane, and
(e) oil, 2.00 ppt carbon black and 1.00 ppt siloxane;

FIG. 2 is a graph of a darkened headlap weathering, designated as G-11, of three samples each of which contained large porosity base granules treated with:

(a) oil only;
(b) oil and 2.00 ppt carbon black; and
(c) oil, 2.00 ppt carbon black and 1.00 ppt siloxane;

FIG. 3 is a graph of a darkened headlap weathering, designated as K-11, of three samples each of which contained large porosity base granules treated with:

(a) oil only;
(b) oil and 2.00 ppt carbon black; and
(c) oil, 2.00 ppt carbon black and 1.00 ppt siloxane;

FIG. 4 is a graph of a darkened headlap weathering, designated as A-11 (WP), of four samples each of which contained fine base granules treated with:

(a) 1 gpt oil only;
(b) 1 gpt oil, 2.00 ppt carbon black and 0.10 ppt siloxane;
(c) 1 gpt oil, 2.00 ppt carbon black and 0.25 ppt siloxane, and
(d) 1 gpt oil, 2.00 ppt carbon black and 0.50 ppt siloxane;

FIG. 5 is a graph of a darkened headlap weathering, designated as K-11 (WP), of five samples each of which contained fine base granules treated with:

(a) oil only;
(b) 2 gpt oil, 2.00 ppt beaded coarse carbon black (BP450) and 0.5 ppt siloxane;
(c) 2 gpt oil, 2.00 ppt fluffy fine carbon black (ELFTEX 8) and 0.5 ppt siloxane;
(d) 2 gpt oil, 2.00 ppt fluffy coarse carbon black (MONARCH) and 0.50 ppt siloxane; and
(e) 2 gpt oil, 2.00 ppt fluffy extra coarse carbon black (CSX333) and 0.50 ppt siloxane; and FIG. 6 is a graph of a darkened headlap weathering of six samples each of which contained fine base granules treated with:

(a) 1 gpt oil (A-11 Standard Headlap);
(b) 1 gpt oil, 1.00 ppt carbon black and 0.5 ppt siloxane (A-11 Darkened Headlap);
(c) 2 gpt oil, (G-11 Standard Headlap);
(d) 2 gpt oil, 2.00 ppt carbon black and 0.50 ppt siloxane (G-11 Darkened Headlap);
(e) 2 gpt oil (K-11 Standard Headlap); and
(f) 2 gpt oil, 2.00 ppt carbon black and 0.50 ppt siloxane (K-11 Darkened Headlap).

DETAILED DESCRIPTION OF THE INVENTION

Reference is now being made to the source materials of the present invention, illustrative examples, and performance evaluation data, including graphs, of the darkened headlap weathering. In the specification the following abbreviations/identifications are used, unless otherwise indicated:

ppt=parts per ton;
gpt=gallons per ton;
DF104=siloxane (General Electric);
Hyprene V-300=process oil (Ergon, Inc.);
BP450=beaded coarse carbon black (Cabot Corp.);
Kaiser 003=process oil (Arco)
ELFTEX 8=fluffy fine carbon black (Cabot Corp.);
TBS106BR=siloxane (Path Silicones);
L-300=process oil (Cross Oil Co.);
MONARCH 120=fluffy coarse carbon black (Cabot Corp.); and
CSX333=fluffy extra coarse carbon black (Cabot Corp.).

The base mineral granules for use in the invention may be any of the conventional type granules normally used in the manufacture of roofing materials. The source of such granules include limestone, rock, greenstone, nephylene syenite, gravel slate, gannister, quartzite and greystone. The granules are typically in a size range between about 10 to 35 mesh, i.e. particle sizes which will pass through an 8 mesh screen but retained on a 35 mesh screen. However, somewhat smaller or larger granules may also be used.

The carbon blacks used in the present invention are well known in the art including: beaded coarse carbon black, fluffy fine carbon black, fluffy coarse carbon black, and fluffy extra coarse carbon black. In weathering studies it was found that at equal loadings the carbon blacks used produced different levels of color intensity: fine carbon blacks performed better than coarse carbon blacks; and fluffy carbon blacks performed better than beaded carbon blacks.

The hydrocarbon oils employed in the compositions of the present invention may be either synthetic or natural in origin. These oils, referred to as process oils, can be obtained from petroleum, coal, gas and shale. The oils are of the lubricating oil viscosity range, typically in a 300 c.p. viscosity range. These hydrocarbon oils are often referred to as process oils and are available from several companies, such as Ergon Inc., Arco and Cross Oil Co.

It was found in our laboratory that when a carbon black is used with a hydrocarbon oil the resulting headlap is difficult to handle due to the high rub-off potential of the carbon black. This problem was solved by a partial replacement in the range of from about 25 to about 50% of the hydrocarbon oil with a drying oil, such as boiled linseed oil. The oxidative oils form a surface film that effectively encapsulates the carbon black to eliminate rub-off.

The organosilicone compounds used in the present invention are preferably those defined in formula I and the resins of polyalkylmethylsiloxane, polyalkylethylsiloxane and dimethyl polysiloxane. The organosilicon compounds promote carbon black pigment retention in two ways: by acting as coupling agents between the granule surfaces and carbon black; and by imparting water repellency to impede water penetration into the pores of the pigmented granule surfaces to help retard carbon black loss.

The process of manufacturing darkened headlap comprises:

using a rotary mixer to treat each ton of dried and dedusted headlap-grade crushed rock aggregate of no. 11 grading with a suspension consisting of:

1.0 to 2.5 gallons of a process oil/boiled linseed oil mixture in which the proportion of linseed oil ranges from 25% to 50%;

0.5 to 2.0 lbs of a powdered or beaded fine particle size carbon black;

0.25 to 1.0 lbs of an organosilicon compound; preheating the mixed oil/carbon black/organosilicon suspension to about 90° to 110° F. to reduce viscosity and to improve rock pore penetration; and applying the suspension to a headlap.

The following examples are illustrative of the present invention.

EXAMPLE 1

In the laboratory, 2000 gm preheated base granules were treated with a mixture of 2.0 gms BP450 beaded carbon black and 0.25 gm DF104 siloxane dispersed in 7.5 gms Hyprene V-300 process oil. After 12 months weathering these darkened granules were 2.9 points darker (Hunter Units) than darkened granules without siloxane and 5.9 points darker than standard granules without siloxane and carbon black.

EXAMPLE 2

A mixture of carbon black and siloxane in oil was prepared with the following proportions: 2.0 lbs BP450 beaded carbon black and 1 lb DF104 siloxane in 2 gallons of Kaiser 003 Process Oil. Mixing was done in two 55-gallon drums over a period of 1 hr. This oil mixture was applied to a headlap in a rotary mixer at a rate of about 35 tons/hr. A total of 20 tons of darkened headlap was produced, some of which was used to manufacture asphalt shingles for performance evaluation purposes.

EXAMPLE 3

The following standard and corresponding darkened headlap products were produced in the laboratory. ELFTEX 8 carbon black and TBS106BR siloxane were combined with L-300 Process Oil to produce the darkening headlap treatments. The resulting products were applied to the surface of asphalt-coated aluminum panels and exposed for a period of one year and the change in color measured via monthly color measurements. The data show that unlike standard headlaps that lighten significantly during the early stages of weathering, the color of the darkened headlap products remains more stable during the 12-month test deck exposure.

| PRO-DUCT | PPT BLACK | PPT SILOXANE | gpt OIL | INITIAL L-VALUE | 1-YEAR L-VALUE |
|---|---|---|---|---|---|
| A-11 Standard Headlap | — | — | 1.0 | 22.2 | 27.5 |

-continued

| PRO-DUCT | PPT BLACK | PPT SILOXANE | gpt OIL | INITIAL L-VALUE | 1-YEAR L-VALUE |
|---|---|---|---|---|---|
| A-11 Standard Headlap | 2.0 | 0.5 | 1.0 | 17.1 | 20.6 |
| G-11 Standard Headlap | — | — | 2.0 | 23.5 | 32.2 |
| G-11 Darkened Headlap | 2.0 | 0.5 | 2.0 | 17.5 | 20.9 |
| K-11 Standard Headlap | — | — | 2.0 | 23.2 | 30.6 |
| K-11 Darkened Headlap | 2.0 | 0.5 | 2.0 | 17.4 | 23.2 |

EXAMPLE 4

In the laboratory, 2000 gm of granules were treated with a mixture (heated to 90°–100° F.) of 1 gm ELFTEX carbon black and 0.5 gm TBS106BR siloxane in 15.0 gm L-300 Process Oil. This produced darkened sample A of uniform color. Darkened sample B was prepared in a similar manner except that 50% of the process oil was replaced with boiled linseed oil. After 96 hrs at ambient conditions, the two darkened headlap samples were tested for black rub-off by the following method:

500 gm darkened headlap granules were placed in a 1-pint wide mouth jar and a piece of filter paper (slightly larger than the diameter of the jar) was placed over the mouth of the jar. The jar lid was screwed down tight over the filter paper and the jar placed on a paint shaker and agitated for 1 minute. The jar lid was removed and the filter paper color measured to determine the change in Lightness due to black pigment transfer (rub-off) from the darkened headlap sample.

Using this test, darkened headlap sample A produced a 44.4 point color darkening whereas sample B darkened only 24.7 points.

Numerous studies have been conducted of darkened headlap weathering of the compositions of the present invention as shown in FIGS. 1–6.

Figure 1:
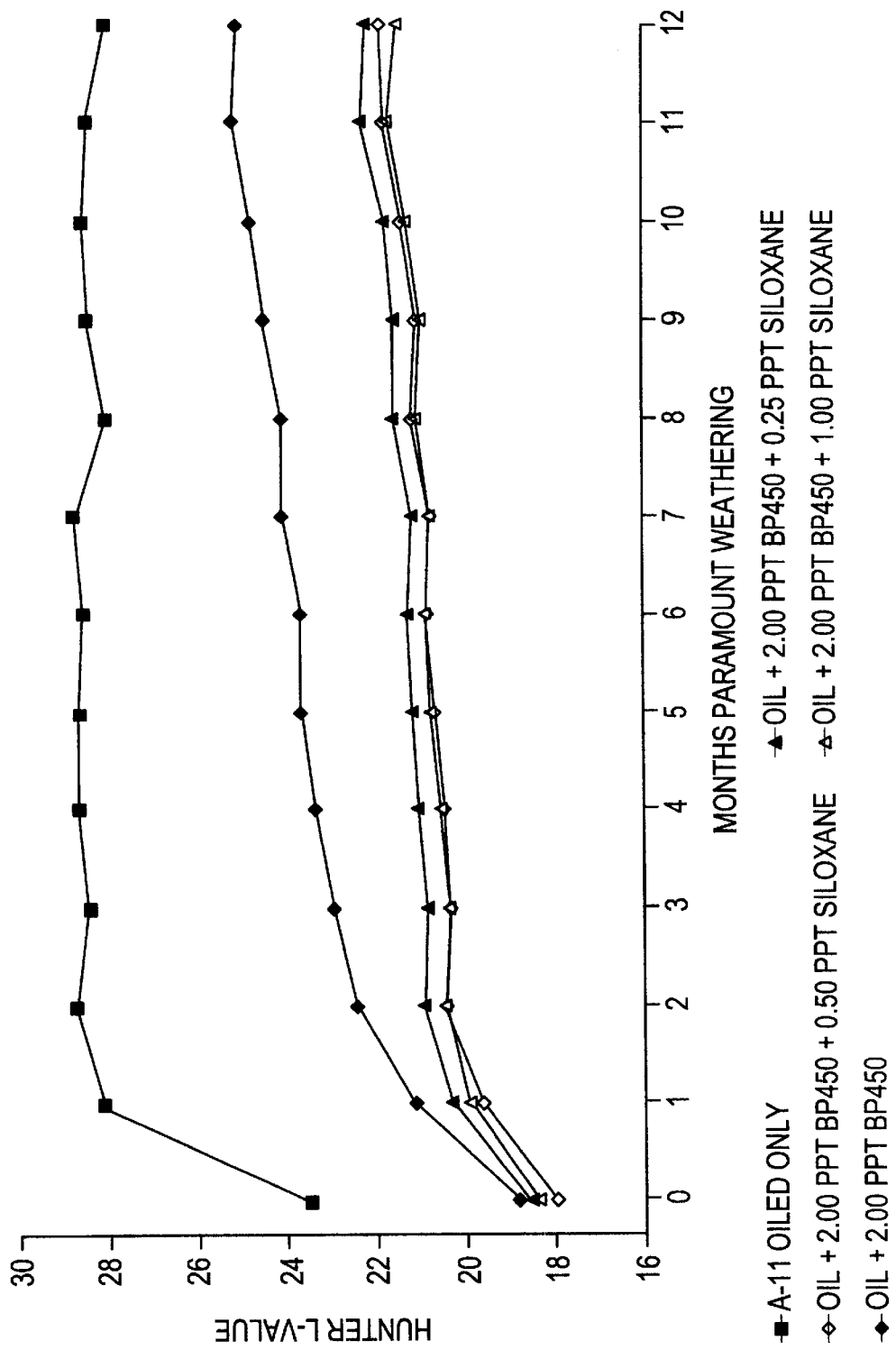

FIG. 1 shows how the rate of darkened A-11 pigment loss is dramatically reduced by the inclusion of DF104 silicon in the oil/carbon black treatment. In FIG. 1 the graph shows five samples on weathering for 12 months versus Hunter L-values wherein the samples of fine base granules were treated with:

(a) process oil only;
(b) process oil and 2.00 ppt BP450 carbon black;
(c) process oil, 2.00 ppt BP450 carbon black and 0.25 ppt DF104 siloxane;
(d) process oil, 2.00 ppt BP450 carbon black and 0.50 ppt DF104 siloxane; and
(e) process oil, 2.00 ppt BP450 carbon black and 1.00 ppt DF104 siloxane.

After 12 months of weathering, there was little difference in performance between the 0.25 lbs/ton, 0.50 lbs/ton and 1.00 lbs/ton DF104 siloxane. This means that for darkened headlap, DF104 siloxane loadings need be no higher than about 0.25 to 0.50 lbs/ton.

FIG. 2 shows weathering performance of darkened headlaps designated as G-11, of three samples each of which contained large porosity base granules treated with:

(a) process oil only;
(b) process oil and 2.00 ppt BP450 carbon black; and
(c) process oil, 2.00 ppt BP450 carbon black and 1.00 ppt DF104 siloxane.

As shown, color retention benefit is realized by the inclusion of siloxane in the process oil/carbon black mixture. However, the color is not as stable and the differential is not as pronounced as in the case of the darkened A-11 headlap shown in FIG. 1. The larger G-11 base rock porosity/pore size results in less effective carbon black retention and more rapid weathering loss. Essentially the same trend is shown by darkened headlaps, designated as K-11 (FIG. 3), containing similarly large porosity base granules treated with:

(a) process oil only;
(b) process oil and 2.00 ppt BP450 carbon black; and
(c) process oil, 2.00 ppt BP450 carbon black and 1.00 ppt DF104 siloxane.

FIG. 4 shows weathering performance of darkened headlaps, designated as A-11 (WP), in South Florida which is a more severe weathering location than the East Coast where the headlaps of FIGS. 1–3 were tested. The four samples tested contained fine base granules treated with:

(a) 1 gpt process oil only;
(b) 1 gpt process oil, 2.00 ppt BP450 carbon black and 0.10 ppt DF104 siloxane;
(c) 1 gpt process oil, 2.00 ppt BP450 carbon black and 0.25 ppt DF104 siloxane, and
(d) 1 gpt process oil, 2.00 ppt BP450 carbon black and 0.50 ppt DF104 siloxane.

The darkened A-11 (WP) headlaps retained a good color after 12 months of exposure.

The effects of different types of carbon blacks on headlaps, designated as K-11 (WP), weathering performance in South Florida are shown in FIG. 5.

The carbon blacks tested were:
beaded coarse carbon black (BP450);
fluffy fine carbon black (ELFTEX 8);
fluffy coarse carbon black (MONARCH); and
fluffy extra coarse carbon black (CSX333).

Each of the five samples contained fine base granules. One of the samples was treated with 2 gpt process oil only, while each of the remaining four samples were treated with:

2 gpt process oil, 2.0 ppt of the above-designated carbon blacks, and 0.5 ppt DF104 siloxane. As shown by the graphs, these carbon blacks produced different levels of color intensity. From the data it was concluded that fine carbon blacks perform better than coarse carbon blacks, and that fluffy carbon blacks perform better than beaded carbon blacks.

FIG. 6 depicts in graphs the weathering performance of standard and darkened headlaps described in Example 3 wherein: the A-11 standard headlap contains only 1 gpt process oil; the G-11 and K-11 standard headlaps contain 2.0 gpt process oil only; the darkened A-11 headlap contains 1.0 gpt process oil, 2.0 ppt carbon black and 0.5 ppt siloxance; and the darkened headlaps G-11 and K-11 contain 2.0 gpt oil, 2.0 ppt carbon black and 0.5 ppt siloxane.

The data show that unlike standard headlaps that lighten significantly during the early stages of weathering, the color of the darkened headlap products remains more stable during the 12-month test deck exposure.

Various modifications of the present invention will become apparent to those skilled in the art. This invention is intended to include such modifications to be limited only by the scope of the claims.

What is claimed is:

1. A composition for application to headlap sections of roof shingles comprising:
   base granules;
   of from about 1.0 to about 2.5 gallons of a hydrocarbon oil and drying oil mixture per ton of granules;
   of from about 0.5 to about 2.0 pounds of carbon black per ton of granules; and
   of from about 0.25 to about 1.0 pounds of an organosilicon compound having hydrolyzable functional groups and oleophillic groups.

2. The composition of claim 1 wherein said drying oil is present in the hydrocarbon oil and drying oil mixture in the range of from about 25% to about 50%.

3. The composition of claim 2 wherein said drying oil is boiled linseed oil.

4. The composition of claim 1 wherein said base granules have a particle size range of from about 10 to 35 mesh.

5. The composition of claim 1 wherein said carbon black is selected from the group consisting of: beaded fine carbon black, beaded coarse carbon black, fine carbon black, coarse carbon black, extra coarse carbon black, fluffy fine carbon black and fluffy coarse carbon black.

6. The composition of claim 1 wherein said organosilicon compound is a monomeric silane having the formula I:

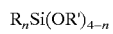

wherein
R is a large organic group;
R' is lower alkyl having 1 to 6 carbons, and
n is 1–3.

7. The composition of claim 6 wherein R is a long-chain alkyl group of at least 6 carbons.

8. The composition of claim 7 wherein R is a long-chain alkyl group having 8 to 28 carbons.

9. The composition of claim 6 wherein n is 1.

10. The composition of claim 6 wherein said organosilicon compound is selected from the group consisting of:
    n-Decyltriethoxysilane
    Dodecyltriethoxysilane
    Hexadecyltrimethoxysilane
    Hexyltrimethoxysilane
    Isooctyltrimethoxysilane
    n-Octadecyltriethoxysilane
    n-Octadecyltrimethoxysilane
    n-Octyltriethoxysilane and
    n-Octyltrimethoxysilane.

11. The composition of claim 1 wherein said organosilicon compound is a siloxane polymer having two or more silane units.

12. The composition of claim 11 wherein said siloxane polymer is selected from the group consisting of: polyalkylmethylsiloxane, polyalkylethylsiloxane and dimethyl polysiloxane.

13. A process of preparing a darkened headlap for a roof shingle comprising the steps of:
    treating each ton of a dried crushed rock aggregate having a particle size of from about 10 to about 35 mesh with a suspension consisting of:
    from about 1.0 to about 2.5 gallons of oil;
    from about 0.5 to about 2.0 lbs of a carbon black;
    from about 0.25 to about 1.0 lbs of an organosilicon compound having hydrolyzable functional groups and oleophillic groups;

preheating the suspension to about 90°–110° F. to reduce viscosity and improve rock pore penetration; and applying the preheated suspension to a headlap.

14. The process of claim 13 wherein said oil consists of a hydrocarbon oil and drying oil mixture.

15. The process of claim 14 wherein said drying oil is present in the hydrocarbon oil and drying oil mixture in the range of from about 25% to about 50%.

16. The process of claim 15 wherein said drying oil is boiled linseed oil.

17. The process of claim 13 wherein said carbon black is selected from the group consisting of: beaded fine carbon black, beaded coarse carbon black, fine carbon black, coarse carbon black, extra coarse carbon black, fluffy fine carbon black and fluffy coarse carbon black.

18. The process of claim 13 wherein said organosilicon compound is a monomeric silane having the formula I:

$$R_n Si(OR')_{4-n}$$

wherein

R is a large organic group;

R' is lower alkyl having 1 to 6 carbons, and n is 1–3.

19. The process of claim 18 wherein n is 1.

20. The process of claim 18 wherein said organosilicon compound is selected from the group consisting of:

n-Decyltriethoxysilane

Dodecyltriethoxysilane

Hexadecyltrimethoxysilane

Hexyltrimethoxysilane

Isooctyltrimethoxysilane n-Octadecyltriethoxysilane n-Octadecyltrimethoxysilane n-Octyltriethoxysilane and n-Octyltrimethoxysilane.

21. The process of claim 13 wherein R is a long-chain alkyl group of at least 6 carbons.

22. The process of claim 21 wherein R is a long-chain alkyl group having 8 to 28 carbons.

23. The process of claim 13 wherein said organosilicon compound is a siloxane polymer having two or more silane units.

24. The process of claim 23 wherein said siloxane polymer is selected from the group consisting of: polyalkylmethylsiloxane, polyalkylethylsiloxane and dimethyl polysiloxane.

* * * * *